United States Patent
Mandart et al.

(10) Patent No.: US 6,799,798 B1
(45) Date of Patent: Oct. 5, 2004

(54) SUPPORT AND RESTRAINT STRUCTURE FOR PASSENGERS OF PUBLIC TRANSPORT VEHICLES

(75) Inventors: Didier Mandart, Bischheim (FR); Robert Lohr, Hangenbieten (FR); Jean-Luc Andre, Obernai (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 10/110,601

(22) PCT Filed: Oct. 6, 2000

(86) PCT No.: PCT/FR00/02785
§ 371 (c)(1),
(2), (4) Date: May 9, 2002

(87) PCT Pub. No.: WO01/26926
PCT Pub. Date: Apr. 19, 2001

(30) Foreign Application Priority Data

Oct. 12, 1999 (FR) .............................. 99 12854

(51) Int. Cl.⁷ .............................................. A47C 31/00
(52) U.S. Cl. .................................. 297/183.6; 297/183.7
(58) Field of Search ........................... 297/183.6, 183.7, 297/183.1, 183.8, 463.2, 463.1; 293/115, 143; 16/438, 434, 110.1; 280/727, 756

(56) References Cited

U.S. PATENT DOCUMENTS

| | | | | |
|---|---|---|---|---|
| 2,231,060 A | * | 2/1941 | Eber ............................ | 16/438 |
| 2,450,093 A | * | 9/1948 | Richardson ............... | 297/183.8 |
| 2,921,799 A | * | 1/1960 | Hatten ......................... | 280/756 |
| 3,012,797 A | * | 12/1961 | Manting ...................... | 280/507 |
| 3,414,909 A | * | 12/1968 | Provi et al. ................... | 4/577.1 |
| 3,843,192 A | | 10/1974 | Morgan ........................ | 296/64 |
| 4,014,523 A | * | 3/1977 | Reader ......................... | 256/59 |
| 4,073,036 A | * | 2/1978 | Bustin ........................ | 16/110.1 |
| 4,077,664 A | * | 3/1978 | Harder, Jr. ................ | 297/183.8 |
| 4,106,810 A | * | 8/1978 | Barecki ..................... | 297/183.7 |
| 4,166,297 A | * | 9/1979 | Saleeby ........................ | 4/578.1 |
| 5,086,858 A | * | 2/1992 | Mizuta et al. ............. | 180/68.3 |
| 5,658,044 A | * | 8/1997 | Krevh ...................... | 297/183.6 |
| 5,918,710 A | * | 7/1999 | Sher .......................... | 190/18 A |
| 6,557,930 B1 | * | 5/2003 | Bruggemann et al. ...... | 296/205 |

FOREIGN PATENT DOCUMENTS

| | | | |
|---|---|---|---|
| DE | 16 079 | 10/1961 | |
| DE | 299 03 905 U1 | 9/1999 | ............ B60N/3/02 |
| EP | 0 167 680 A2 | 1/1986 | ............ B60N/1/00 |
| EP | 0 176 423 A1 | 4/1986 | ............ B60N/1/00 |
| EP | 0 769 416 A1 | 4/1997 | ............ B60B/3/02 |
| FR | 2 310 727 | 12/1976 | ........... A47C/1/036 |
| FR | 2 401 796 | 3/1979 | ............ B60N/3/02 |
| FR | 2 445 780 | 8/1980 | ............ B60N/3/02 |
| FR | 2 471 881 | 6/1981 | ............ B60N/3/02 |
| WO | 93/02891 | 2/1993 | |
| WO | 95/16258 | 6/1995 | ........... G09F/19/00 |

* cited by examiner

Primary Examiner—Peter M. Cuomo
Assistant Examiner—Stephanie Harris
(74) Attorney, Agent, or Firm—Davis & Bujold, P.L.L.C.

(57) ABSTRACT

The support and restraint structure is a tubular frame (1) generally oval in shape having two branches (2) and (3), the extremities of which are interconnected at two rounded corners (4) and (5) and having one or two cross-bars and elements (13), (14) and (15) attaching it to its support: the side (8) of a seat (9), a wall, a vertical vehicle structure on the body, or the like, maintaining it at a distance from and in a lateral position relative to the support so it can provide an effective gripping and balance means for standing passengers of any height without causing any significant interference. This invention is of interest to builders of equipment and accessories for public transportation vehicles.

20 Claims, 4 Drawing Sheets

SUPPORT AND RESTRAINT STRUCTURE FOR PASSENGERS OF PUBLIC TRANSPORT VEHICLES

FIELD OF THE INVENTION

The present invention relates to a support and restraint structure for passengers standing in a public transport vehicle which provides something for them to grip in order to avoid being thrown off balance or falling when the ride becomes rough.

BACKGROUND OF THE INVENTION

Passenger transport vehicles, particularly public urban transport vehicles such as buses, trams and metros, are designed to accommodate both seated and standing passengers with preference being given to standing passengers so that more people can ride, particularly during rush hours.

For this reason, public transport vehicles are generally equipped with support and restraint devices which the standing passengers can grip when the vehicle turns, brakes, or accelerates, preventing them from being thrown off balance, being jostled or falling, thus eliminating danger to the passengers and those nearby.

The goal of the invention is to provide a support and restraint structure with a particularly advantageous shape that can be installed on the side of a seat in a passenger transport vehicle.

Two types of devices are conventionally in use in public transport vehicles at present: hand grips and restraining bars.

The support grips are shaped like loops that can be seized at the bottom and are suspended from the vehicle ceiling. They may be made of a flexible strap such as that described in Patent Application No. FR 2.401.796 or they may have a rigid body such as the hand grips disclosed in application Nos. FR 2.471.881 and WO 93/02891. These grips may either be fixed or articulated at their upper portion near the area of attachment.

Suspended hand grips can only be used by one person at a time. In addition, they are installed at a fixed height and cannot be adapted to the height of different passengers. Thus, children or adults of small stature cannot generally reach them. Ironically, these grips also cause difficulties for tall passengers, since they reach the level of their heads. Aside from these two extremes, the fixed height of the grip is often an uncomfortable position for passengers.

Conversely, the restraint device according to the invention comprises quite an extensive contact area allowing several passengers to hold it simultaneously without crowding each other or the nearby passengers. It can also be gripped over a considerable and continuous range of levels, thus providing a comfortable support for passengers of any height.

Restraint bars affixed to passenger seats are also known in the art. Some of these extend and project from the back of the seat. Thus, they extend transversely into the aisle, decreasing the amount of free space and interfering with passenger circulation.

Other restraints extend above the upper extremity of the passenger seat, for example, the device described in Patent No. EP 0 167 680. In this case, the support area offered is limited and generally allows only one person to hold it. Thus, in actuality, the useful surface of these bars is very limited. Furthermore, in use this type of bar is often bothersome for the passenger occupying the seat. Vertical bars are also known in the art, such as those described in Patent Nos. EP 0 769 416, FR 2. 445.780 and WO 95/16258. While these bars may be advantageously installed against a wall or in a fairly large empty space within the vehicle, they are not at all adapted to placement in an aisle between rows of seats, as their considerable size significantly reduces the space available to passengers.

In contrast to these known systems, this invention proposes a support and restraint structure of reduced size with an almost completely usable surface that allows several passengers to use it simultaneously and in comfort.

To resolve this technical problem, the support structure according to the invention consists of a closed tubular perimeter which may be shaped like an elliptical loop. This device is preferably either attached to the side of the seat of a public transportation vehicle or mounted on the vehicle body, with the ellipsis plane being perpendicular to the back of said seat, that is, lateral to the seat. Thus, the restraint structure of the invention does not disturb either the passenger seated in the seat which forms the support for attachment or the passengers who wish to circulate inside the vehicle.

SUMMARY OF THE INVENTION

The support and restraint structure according to the invention is fairly large in size and extends well above the upper extremity of the seat back that forms its support. Therefore, it offers a particularly extensive area to grip in both length and width and it can be used comfortably and simultaneously by several passengers of any height. However, because of its shape and advantageous arrangement, it occupies only a small amount of space.

The support and restraint structure of the invention may further comprise one or more tubes, for example, horizontal tubes, extending transversely inside the ellipse, further increasing the amount of gripping surface available.

The support structure of the invention is particularly well adapted for attachment to the side of a seat. However, it can just as well be placed on a pillar, a wall, a vertical portion of the vehicle body structure, or any other suitable location in the vehicle.

The general shape of the outline, with its inwardly curved branches and rounded corners and gripping zones, increases the safety of the passengers gripping it; if they are jolted, contact with these surfaces would not injure them.

BRIEF DESCRIPTION OF THE DRAWINGS

The invention will now be described, by way of example, with reference to the accompanying drawings in which.

DETAILED DESCRIPTION OF THE INVENTION

Figure 1:
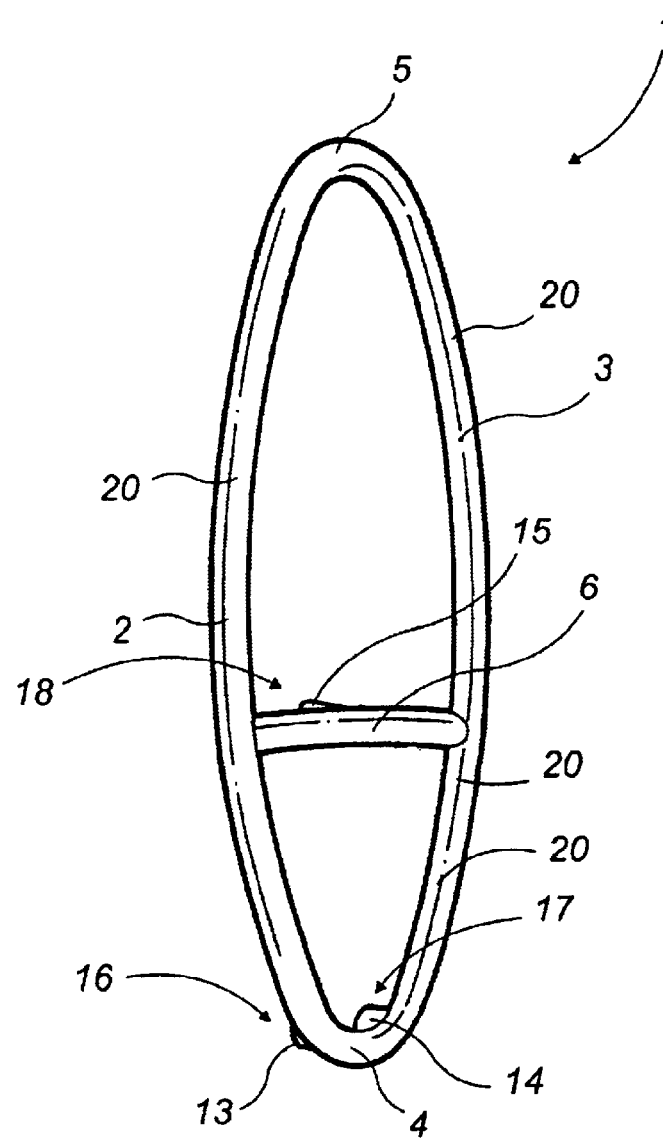
FIG. 1 is a perspective of the support device of the invention in its basic version.

The support and restraint structure of the invention is designed specifically, but not necessarily, to equip the interior of a public transport vehicle, particularly an urban transport vehicle used by passengers who remain standing. It may used in the aisle near the seats as well as in the entryway compartment, or in any other location.

The support and restraint structure of the invention takes the form of a frame 1, preferably quadrangular, with a smooth profile, and made of a metal tube circular section.

The frame has a multitude of contact or gripping and support zones or areas 20 without any abrupt or rough projections along its entire perimeter.

For this reason, the corners of the frame are rounded. Two opposing corners may be very open so that the two sides adjacent these two opposing corners form two inwardly curved branches rejoined at their extremities.

In the embodiment shown in the drawings and taken as an exemplary embodiment, the frame affects a generally oval or elliptical shape with two inwardly curved branches 2 and 3 opening towards each other and with extremities 4 and 5. The extremities of branches 2 and 3 rejoin each other to form the rounded extremities of the frame along two closed angles, constituting the oval or elliptical perimeter of the frame.

According to a first variation, the branches are reconnected to each other at the lower half of the frame by a cross-bar 6 that is straight or slightly curved toward the top (FIG. 1).

Figure 2:
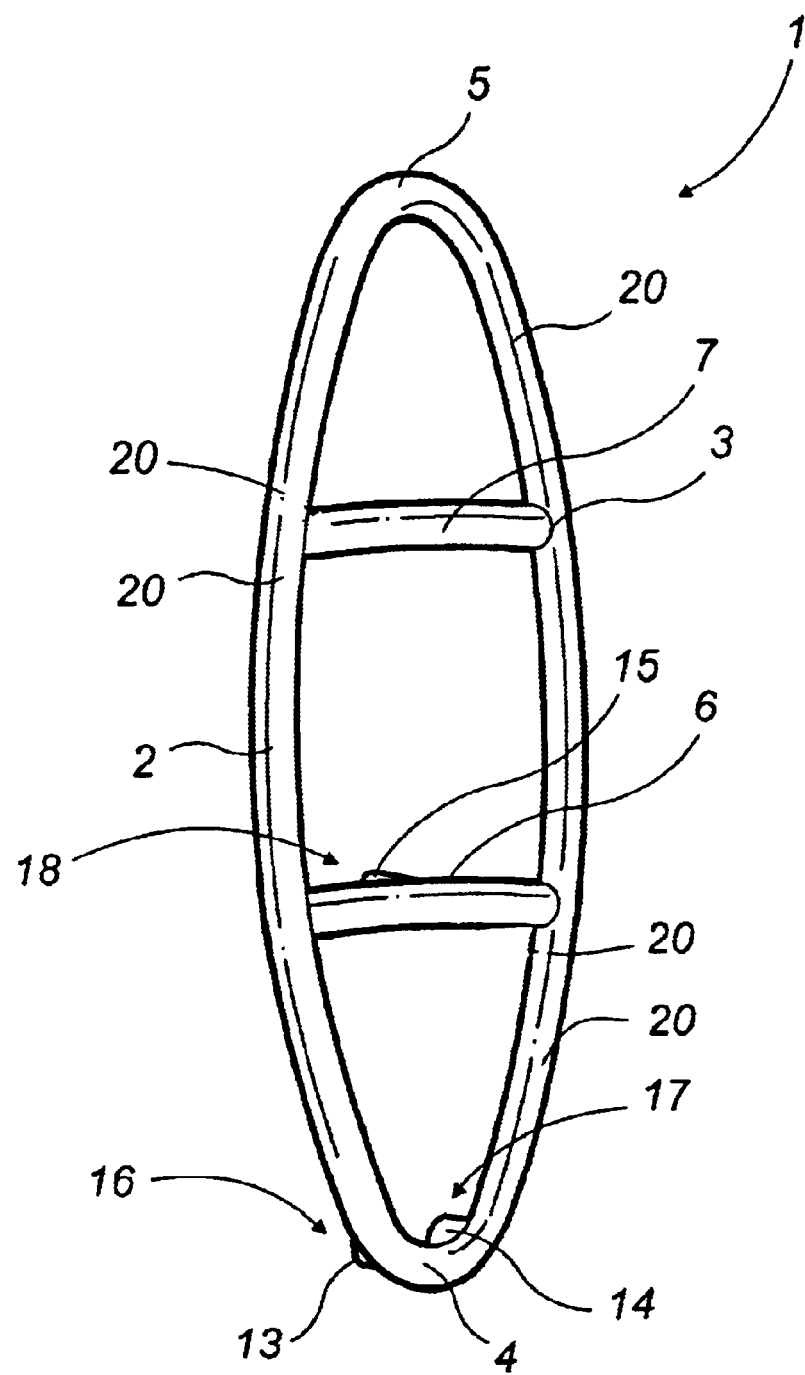
FIG. 2 is a perspective of the support device of the invention in its reinforced version.

According to a second variation, such as that shown in FIG. 2, lower cross-bar 6 is duplicated by an upper cross-bar 7 which is symmetrical relative to a median transverse perpendicular plane.

The support and restraint structure of the invention is designed for possible attachment to the support surface 8 of a chair 9. This design is intended for the use of passengers standing in the central aisle. It may be in another location, for example, affixed to a wall support surface 10 or to a vertical structure 11 of the vehicle body, perhaps in the entryway compartment 12 of a car or train module.

It is always in a lateral position relative to its attaching support and attached at a sufficient distance from said support to provide a comfortable gripping area for effectively maintaining the balance of those using it.

For this purpose, the lower portion comprises rear facing projections, for example, three attachment elements 13, 14 and 15 which are used to solidly attach the support structure to its support, for example, to the side 8 of a seat 9 or to an vertical element 11 on the vehicle body.

The attachment means, which may number 3, are integral with the seats or the vertical elements, and may consist of screw-nut combinations or threaded pins cooperating with inserts.

A lower, two-point attachment near the lower portion and another attachment near the middle of lower cross-bar 6 can be seen. This three-point attachment system ensures that the support structure is solidly maintained, allowing its upper, overhanging structure to remain quasi-attached despite the force exerted by several passengers gripping it and using it for support.

A two-point attachment would also be sufficient if the two points were spaced far apart from each other on the same branch or on two different branches.

For ease in gripping it, it is important that the support structure be separated by some distance from the support to which it is attached. For this reason, the attachment elements have an extension or a cross-piece. As shown, there could also be a raised area such as areas 16, 17 and 18 formed in the rear of the frame extremities and of cross-bar 6 above each attachment element. The preferred form of these raised areas is such that each of their frontal surfaces constitutes a support surface contacting the support to which the support structure is attached.

Figure 3:
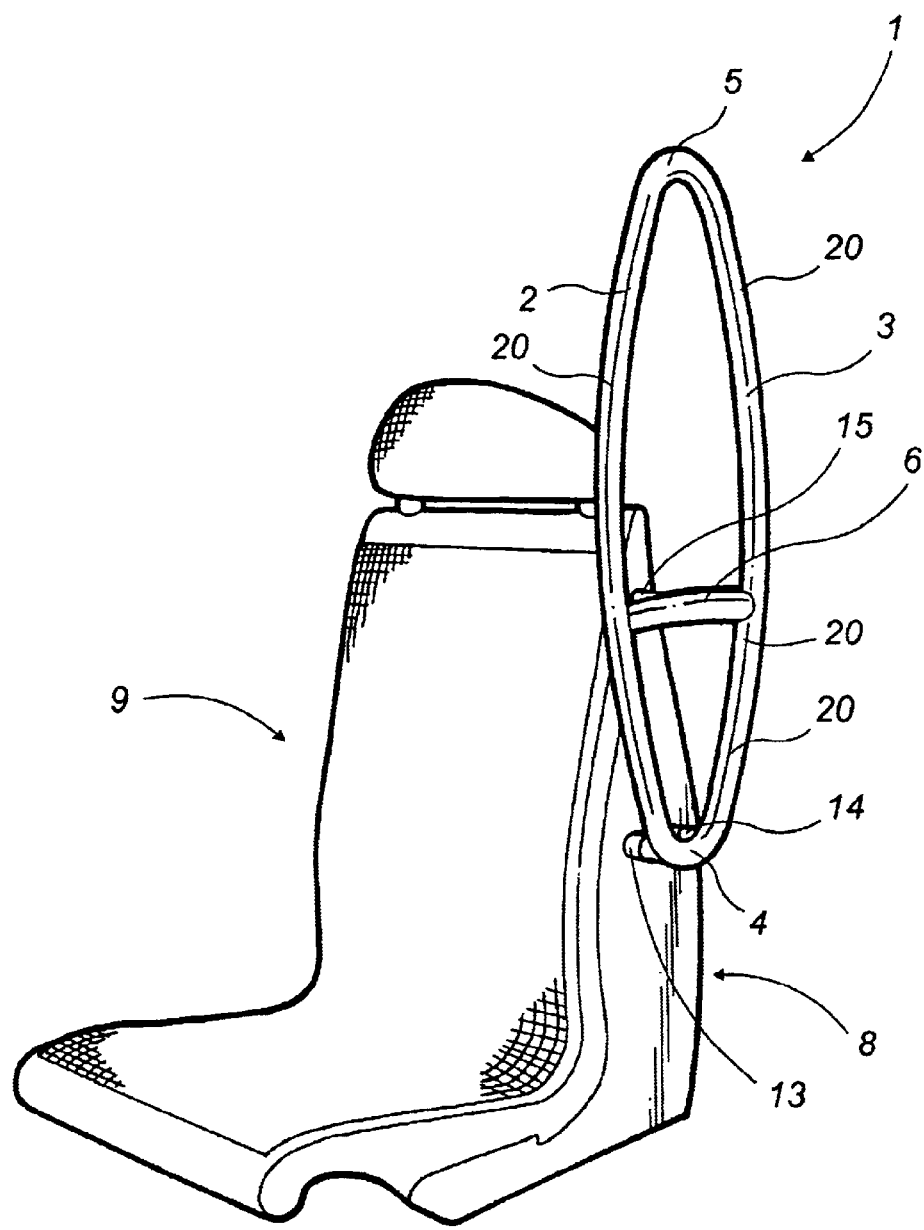
FIG. 3 is a perspective of the support device attached to the side of a seat.
Figure 4:
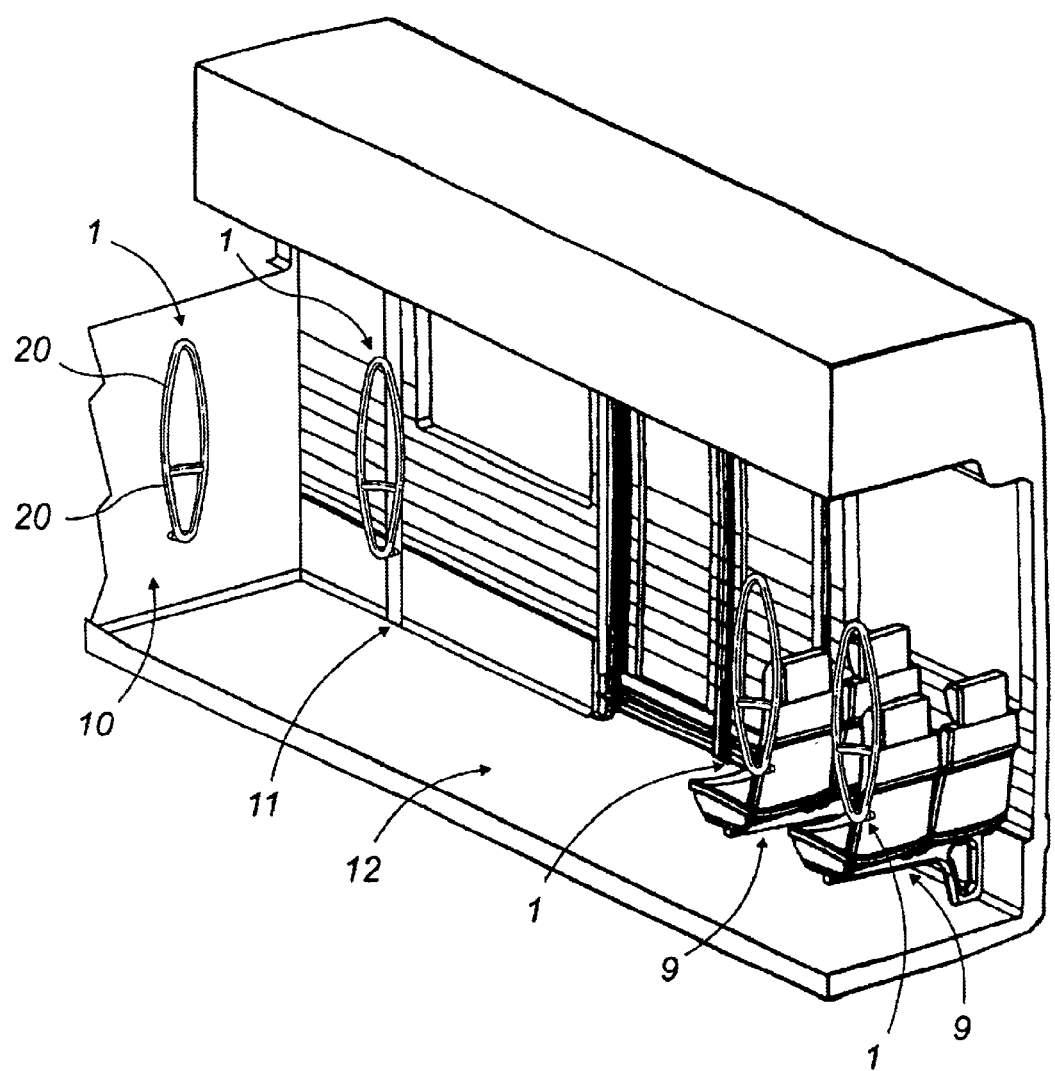
FIG. 4 is a perspective of the entryway compartment of a public transportation vehicle showing several support devices according to the invention, one of which is attached to a vertical portion of the vehicle body and the other to a wall.

As shown in FIGS. 3 and 4, the support structure according to the invention offers many areas 20 for gripping its perimeter and its cross-bar or bars 6 or 7 so that every passenger, short or tall, child or adult, can benefit from an effective support structure at a level adapted to his or her height.

The tubular shape of the branches allows the structure to be effectively gripped, and an adult hand can close around it. Furthermore, the lateral surface of the branches is completely smooth. The rounded shape of the corners eliminates any possibility of injury if someone is pushed into the support by the pitching train or other jostling passengers.

For the comfort of the seated passengers, the frame of the support structure of the invention extends into the aisle at a certain distance from the seat, preventing it from being too close to the seated occupant.

What is claimed is:

1. A support and restraint structure for a passenger standing on a public urban transport vehicle, the support and restraint structure comprises:

a fully closed continuous frame (1) having two curved branches (2, 3) with first opposed ends of the two curved branches (2, 3) being connected with one another by a first rounded corner, and second opposed ends of the two curved branches (2, 3) being connected with one another by a second rounded corner to form the closed fully continuous frame, and the first and second rounded corners and the two curved branches (2, 3) lie within a plane and provide a multitude of gripping and support zones along the frame (1) without any abrupt projections formed thereon;

a first attachment element secured adjacent the first rounded corner for connecting the first rounded corner to a support surface, and a second attachment element supported by the frame (1) for connecting the frame to the support surface.

2. The support and restraint structure according to claim 1, wherein a cross bar (6) interconnects intermediate sections of the two curved branches (2, 3) with one another and the cross bar (6) supports the second attachment element.

3. The support and restraint structure according to claim 2, wherein the cross-bar (6) is located in a vertically lower portion of the frame (1) and another cross-bar (7) is located in a vertically upper portion of the frame (1).

4. The support and restraint structure according to claim 2, wherein the cross-bar (6) is located in a vertically lower portion of the frame (1).

5. The support and restraint structure according to claim 1 in combination with a seat (9) having a side (8), wherein the first and second attachment elements facilitate attachment of the frame (1) to the side (8) of the seat (9) in a vertical orientation.

6. The support and restraint structure according to claim 1 in combination with a wall (10), wherein the first and second attachment elements facilitate attachment of the frame (1) to the wall (10) in a vertical orientation.

7. The support and restraint structure according to claim 1 in combination with a vertical element (11) of a vehicle structure, wherein the first and second attachment elements facilitate attachment of the frame (1) to the vertical element (11) of the vehicle structure in a vertical orientation.

8. The support and restraint structure according to claim 1, wherein the frame (1) is a tubular element which has a circular transverse cross section.

9. The support and restraint structure according to claim 1, wherein the frame (1) has an oval shape.

10. The support and restraint structure according to claim 1, wherein the frame (1) has an elliptical shape.

11. The support and restraint structure according to claim 1, wherein the frame (1) has three horizontal attachment elements (13, 14 and 15) and two of the horizontal attachment elements (13, 14) are spaced apart from one another but both are supported by the first rounded corner.

12. The support and restraint structure according to claim 1, wherein the plane of the frame (1) is spaced from the support surface by a raised portion in a rear above an attachment to the support.

13. A support and restraint structure for a passenger standing on a public urban transport vehicle, the support and restraint structure comprises:

a continuous elliptical loop frame (1) consisting of two curved branches (2, 3) with opposed ends of the two curved branches (2, 3) being connected with one another by respective first and second rounded corners, and the first and second rounded corners and the two curved branches (2, 3) lie within a plane and provide a multitude of gripping and support zones without any abrupt projections;

a first cross bar (6) interconnecting intermediate sections of the two curved branches (2, 3) with one another; and a first attachment element secured adjacent the first rounded corner for connecting the first rounded corner to a support surface, and a second attachment element supported by the first cross bar (6) for connecting the first cross bar (6) to the support surface.

14. The support and restraint structure according to claim 13 in combination with a seat (9) having a side (8), wherein the first and second attachment elements facilitate attachment of the frame (1) to the side (8) of the seat (9) in a vertical orientation.

15. The support and restraint structure according to claim 13 in combination with a wall (10), wherein the first and second attachment elements facilitate attachment of the frame (1) to the wall (10) in a vertical orientation.

16. The support and restraint structure according to claim 13 in combination with a vertical element (11) of a vehicle structure, wherein the first and second attachment elements facilitate attachment of the frame (1) to the vertical element (11) of the vehicle structure in a vertical orientation.

17. A support and restraint structure for a passenger of any height standing on a public urban transport vehicle, the support and restraint structures comprise:

a fully continuous frame (1) comprising opposed first and second rounded corners (4, 5) and opposed first and second curved branches (2, 3) with first opposed ends of the first and second rounded corners (4, 5) being connected with one another by the first curved branch (2 or 3) and second opposed ends of the first and second rounded corners (4, 5) being connected with one another by the second curved branch (3 or 2) to form the fully closed continuous frame, and the first and second rounded corners and the first and second curved branches (2, 3) all lie within and define a plane, the frame (1) being attached to but spaced laterally from a support surface by first and second attachment elements (13, 14, or 15), and the frame (1) comprises a section offering a multitude of gripping and support zones without any abrupt projections.

18. The support and restraint structure according to claim 17 in combination with a seat (9) having a side (8), wherein the first and second attachment elements facilitate attachment of the frame (1) to the side (8) of the seat (9) in vertical orientation.

19. The support and restraint structure according to claim 17 in combination with a wall (10), wherein the first and second attachment elements facilitate attachment of the frame (1) to the wall (10) in a vertical orientation.

20. The support and restraint structure according to claim 17 in combination with a vertical element (11) of a vehicle structure, wherein the first and second attachment elements facilitate attachment of the frame (1) to the vertical element (11) of the vehicle structure in a vertical orientation, and the frame (1) is a tubular element which has a circular transverse cross section.

\* \* \* \* \*